Dec. 30, 1958 G. R. BOYER 2,866,895

ELECTRONIC STORAGE DEVICE

Filed March 24, 1954 3 Sheets-Sheet 1

INVENTOR.
GERARD R. BOYER
BY
Albert R. Hodges
ATTORNEY

Dec. 30, 1958 G. R. BOYER 2,866,895

ELECTRONIC STORAGE DEVICE

Filed March 24, 1954 3 Sheets-Sheet 2

INVENTOR.
GERARD R. BOYER

BY Albert R. Hodges
ATTORNEY

INVENTOR.
GERARD R. BOYER
BY
Albert R. Hodges
ATTORNEY

United States Patent Office 2,866,895
Patented Dec. 30, 1958

2,866,895

ELECTRONIC STORAGE DEVICE

Gerard R. Boyer, Montrouge, France, assignor to International Business Machines Corporation, New York, N. Y., a corporation of New York Application March 24, 1954, Serial No. 418,447

Claims priority, application France November 18, 1953

6 Claims. (Cl. 250—27)

Figure 1:
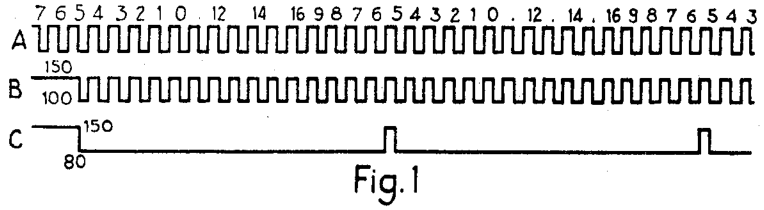

The present invention relates to an electronic storage device and more particularly to a regenerative dynamic storage device adapted to provide, in each succeeding cycle, a pulse having a time position corresponding with that of a pulse stored, or recorded, in the initial operating cycle.

Monostable trigger circuits, sometimes also referred to as one-shot multivibrators, are well known in the art, as is their use to provide a pulse delay of an approximately fixed duration. Since these devices normally require not only a properly regulated power supply but also circuit elements providing a precise time constant, if they are to provide a fixed time delay, they have not in the past been employed in pulse storage devices. Pulse storage devices of the types heretofore known have required a relatively large number of tubes for each recording position, so that it would be highly desirable if they could be replaced by less expensive but equally stable elements.

The principal object of the present invention, therefore, is the provision of a new, more stable, and less complex electronic storage device, comprising a monostable trigger circuit and being adapted to yield at a predetermined instant of each operating cycle a pulse corresponding to a stored, or recorded, value.

Another object of the present invention is the provision of a pulse storage device comprising a plurality of monostable trigger circuits in order to provide an even higher degree of stability and thus to make possible greater interchangeability of the circuit elements employed.

A further object of the present invention is the provision of control circuits in combination with a monostable trigger circuit for the purpose of enhancing the stability of the storage device even under conditions of undesired variations in the supply voltages.

Other objects of the invention will be pointed out in the following description and claims and illustrated in the accompanying drawings, which disclose by way of example, the principle of the invention and the best mode, which has been contemplated, of applying that principle.

Figure 6:
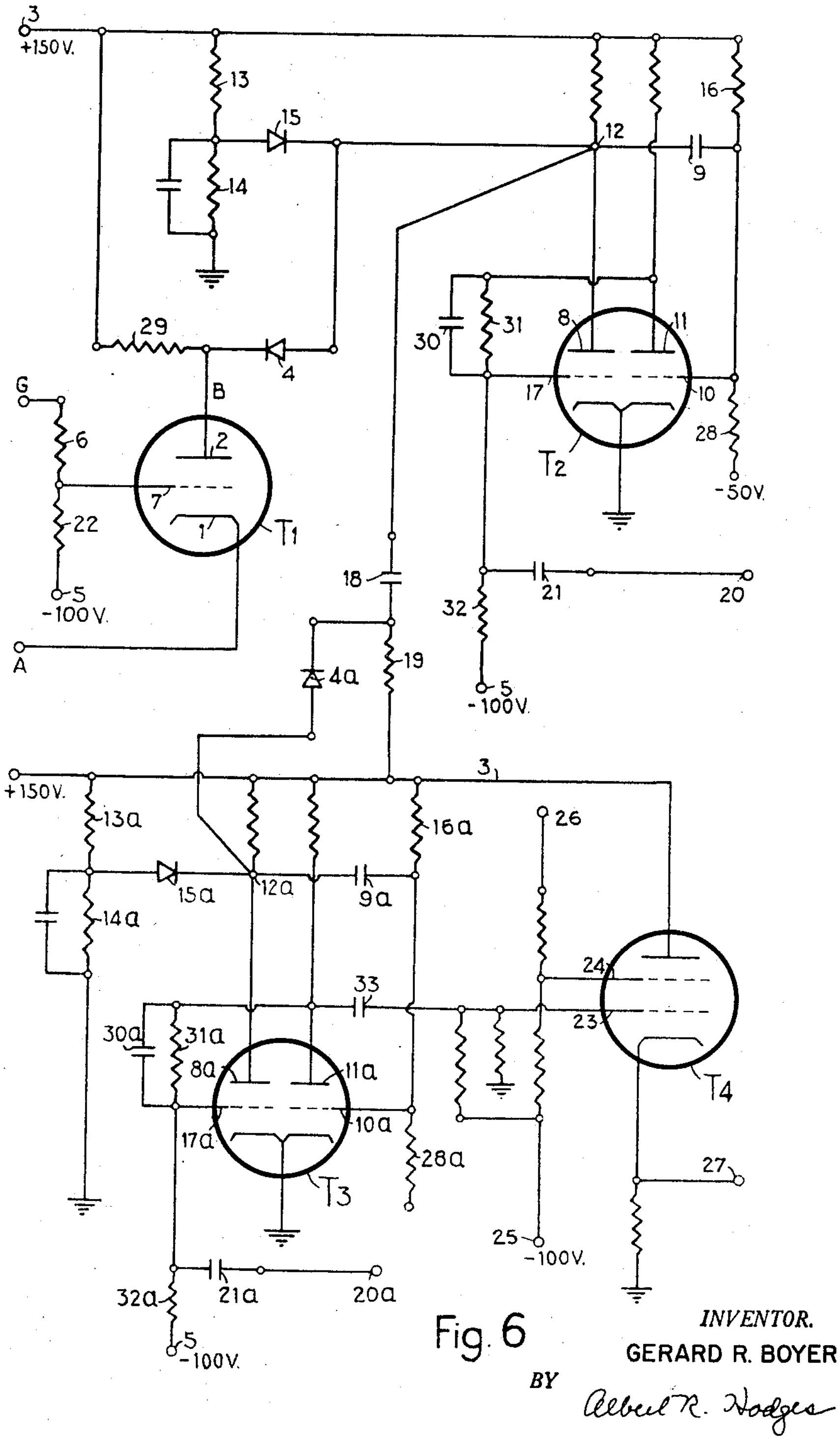
Figure 7:
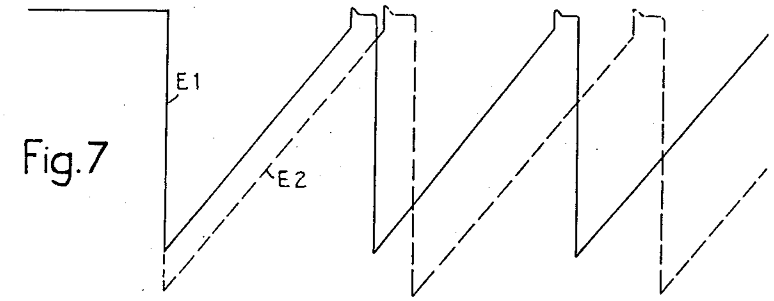
Figure 8:
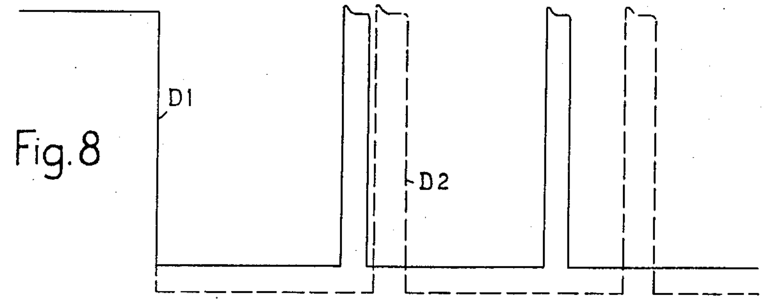
Figure 9:
Figure 9:
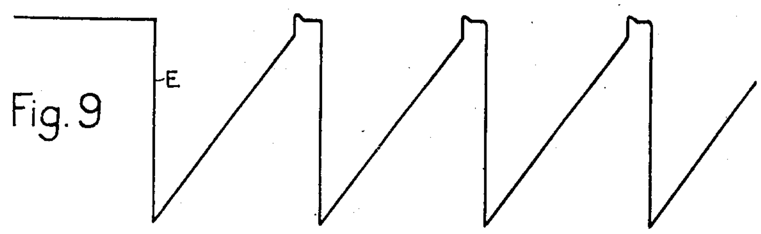
Figure 10:
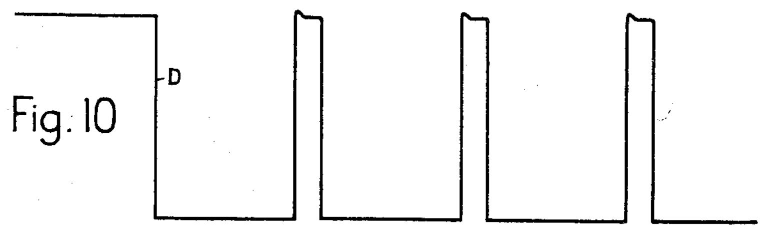

In the drawings:

Figs. 1 through 5 disclose graphical representations, to a common time base, of idealized approximate waveforms which exist in various portions of the system of Fig. 6;

Fig. 6 discloses a schematic circuit diagram of a pulse storage device in accordance with a preferred embodiment of the present invention; and Figs. 7 through 10 disclose graphical representations, to a common time base, illustrating the improved performance which may be realized by utilizing the arrangements of the present invention.

Referring to Fig. 6 of the drawings, there is shown a pulse storage device in accordance with the present invention and comprising essentially a tube T1 intended for the reception of the pulse corresponding to the value to be recorded; a monostable trigger circuit comprising a dual triode tube T2 and the illustrated associated circuit components, this trigger circuit being triggered at the moment that the pulse to be stored is received; and a tube T4 which is adapted to supply output pulses under control of the monostable trigger circuit.

Let it be supposed that the value to be stored, or recorded, is represented by the instant in the operating cycle when a control pulse is applied to the storage device and that the time constant of the monostable trigger circuit is such that it provides an output pulse following a time delay of one operating cycle after the reception of the input pulse, and that such an output pulse is developed in each succeeding operating cycle. Under these conditions, it is evident that a storage device is achieved, since it is able to provide in each succeeding operating cycle a pulse which corresponds in time position to the initially recorded input pulse.

To facilitate the following description, it is assumed that each operating cycle is divided into sixteen portions or points corresponding to the pulses of curve A (Fig. 1) which are designated respectively by reference numerals 9–0 and 10–16. It will be understood that any other desired division of each cycle could have been adopted equally well. Let it also be assumed that the recording, or storing, of value 5, corresponding in time position to pulse 5 of curve A (Fig. 1), has been chosen.

The continuous train of uniformly spaced signal pulses illustrated by curve A (Fig. 1) may be supplied from any suitable source such as a trigger circuit or a multivibrator (not shown). This continuous train of pulses (curve A, Fig. 1) is applied through terminal A (Fig. 6) to cathode 1 of tube T1, which is illustrated, by way of example, as comprising a triode. The voltage applied to grid 7 of tube T1 by means of the voltage divider comprising resistors 6 and 22 connected between terminals G and 5 is maintained at a value sufficient to render tube T1 nonconductive during the first part of the initial operating cycle. Accordingly, the pulses on its cathode 1 are without effect during this portion of the initial operating cycle. At the instant corresponding to the value to be stored, the control potential at terminal G is raised sufficiently to render tube T1 conductive during the remainder of the initial operating cycle and throughout the succeeding operating cycles. More specifically, when the value 5 is to be recorded tube T1 is cut off during points 9, 8, 7 and 6, so that the voltage of its anode 2, connected to terminal 3 through resistor 29, is brought to a value of 150 volts, as illustrated by curve B (Fig. 1). At point 5, the voltage of grid 7 is restored to its normal value and tube T1 becomes conductive. Thus anode 2 begins to oscillate between 100 and 150 volts as shown by curve B (Fig. 1), due to the pulses (curve A) applied to cathode 1.

The first negative-going pulse provided by anode 2 at point 5 is transmitted through diode 4 and capacitor 9 to the right-hand grid 10 of dual triode T2. As illustrated, the circuits associated with this tube are arranged to operate as a monostable trigger circuit. The left-hand portion of tube T2 is normally nonconductive and the right-hand portion conductive. The value of the time constant determined by resistors 16 and 28, and capacitor 9 is so chosen that the trigger circuit has a cycling time, that is, the interval of time after it has been triggered until it returns to its initial condition, which is equal to one operating cycle of the system as a whole. The voltage variations at junction 12 are illustrated by curve C of Fig. 1, and it will be clear from this curve that the cycling time of the trigger circuit corresponds to sixteen pulses of curve A. The first negative-going pulse corresponding to the value 5 to be stored, or recorded, is transmitted by capacitor 9 and causes the right-hand portion of tube T2 to cut off, so that right-hand anode 11 undergoes a voltage rise. The resulting positive-going pulse at anode 11 is supplied to left-hand grid 17 through parallel-connected capacitor 30 and resister 31. When the left-hand portion of the tube T2 becomes conductive, the voltage drop of anode 8 from 150 to 80 volts is reproduced at junction 12. No negative-going pulse can be transmitted through diode 4 to grid 10 while the potential of junction 12 remains at its depressed value, that is, not until it returns from 80 to 150 volts when the left-hand portion of tube T2 again becomes nonconductive. Thus, as long as the monostable trigger circuit is triggered, the 100 volts applied to the cathode of diode 4 is too high to allow the transmission of the pulses represented by curve B (Fig. 1) to grid 10 of tube T2. The trigger circuit is therefore permitted to return to its initial state one cycle after it has been triggered.

When the potential of the right-hand electrode of capacitor 9 reaches a value which renders the right-hand portion of tube T2 again conductive, a negative-going pulse is transmitted to left-hand grid 17 so that the left-hand portion of the tube is rendered nonconductive and the potential of junction 12 returns to a value of 150 volts. This voltage is sufficient to enable diode 4 to transmit another pulse (curve B, Fig. 1) from tube T1. The first such pulse transmitted by diode 4 therefore corresponds to the pulse of curve A, the time position of which represents the value 5, and it accomplishes the same thing as did the corresponding pulse in the initial operating cycle. It will be apparent, therefore, that a single control pulse applied to terminal G is sufficient to secure, at ponit 5 of each cycle, the inversion of the conduction states of the two portions of tube T2 which occurs when the monostable trigger circuit is first triggered and then returns to its normal state, so that an output pulse is developed, at junction 12, once during each operating cycle.

In accordance with an additional feature of the present invention, an arrangement is provided to minimize variations in the periodicity of the system which would otherwise result either from the aging of tube T2 or from the substitution of a new tube having slightly different characteristics. For this purpose, the potential variation of junction 12 is restricted by providing a voltage divider comprising resistors 13 and 14 connected in series between positive potential source 3 and ground, the junction of these resistors being connected through diode 15 to junction 12. With this arrangement, junction 12 is effectively prevented from becoming less positive than the junction of resistors 13 and 14. The effectiveness of this arrangement is brought out by reference to curves E1 and E2 of Fig. 7, which illustrate the voltage variations of right-hand grid 10 of tube T2, and the curves D1 and D2 of Fig. 8, which show the potential variations of junction 12, respectively for two different tubes when the negative-going excursions of junction 12 are not controlled by the presence of diode 15. It will be apparent from these two figures that the periodicity of the system using one tube may, under this condition, have a value different from that corresponding to the duration of one operating cycle realized with the other tube. If diode 15 is arranged as shown in Fig. 6, however, the curves which represent the performance with one tube will substantially coincide with those representing that obtained with the other tube, as shown by curves E and D, respectively of Figs. 9 and 10. The improved performance realized by the arrangement of the present invention is also clearly brought out by comparing curves E and D of Figs. 9 and 10 with the uniformly spaced pulses of curve C1 (Fig. 9) it being noted that the back slopes of the pulses of curve C1 coincide with the several leading edges of each of curves E and D. It is noted that, in accordance with the present invention, the value to which the negative-going excursions of junction 12 are limited is not fixed but varies directly as a function of the supply voltage at terminal 3. Thus the stabilizing arrangement just described also serves to minimize the effect of undesired supply-voltage variations upon the periodicity of the system.

Figure 2:
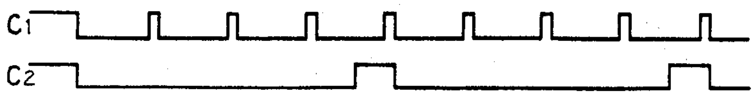

The operational stability of the pulse storage device may be increased, in accordance with the present invention, by the combination of a plurality of monostable trigger circuits operating as a frequency divider. By way of example, two trigger circuits are represented in Fig. 6 by tubes T2 and T3 with their associated circuit components. If the operating cycle comprises sixteen points or divisions as in the preceding example, the period adopted for the first trigger circuit is that corresponding to the emission of four consecutive pulses (curve A, Fig. 1). As a result, the first monostable trigger circuit is then triggered four times for each operating cycle, thus causing voltage variations at junction 12 as shown by curve C1 (Fig. 2). The second trigger circuit works in the same way as in the preceding example. In this case, however, the period of the second trigger circuit corresponds with a full operating cycle comprising sixteen pulses, as illustrated by the voltage variations at junction 12*a* shown by curve C2 (Fig. 2).

As shown in Fig. 6, the control circuits of the second trigger circuit are similar to those of the first trigger circuit. Although the elements which operate in a similar way bear an identical reference numeral with the addition of the letter "*a*," it will be understood that their values are different in order to obtain two distinct periods or cycling times.

During a recording cycle, when tube T1 is made conductive by the pulse corresponding to the recorded value (which is 5 in the chosen example), the first negative-going pulse at anode 2 is transmitted, through diode 4 and capacitor 9, to right-hand grid 10 of tube T2. This pulse is also sent to right-hand grid 10*a* of tube T3 through diode 4, capacitor 18, diode 4*a* and capacitor 9*a*. The two monostable trigger circuits are thus simultaneously triggered, so that a voltage drop is observed at junctions 12 and 12*a* as represented respectively by curves C1 and C2 of Fig. 2.

Due to the time constant determined by the values of resistors 16 and 28 and capacitor 9, the first trigger circuit comes back to its initial state after a period corresponding to four pulses (curve A, Fig. 1). Accordingly, a voltage increase is observed at junction 12, and this increase raises the anode of diode 4 to a value sufficient to enable the transmission of a pulse corresponding to point 1 of the operating cycle. This pulse again causes the triggering of the first monostable trigger circuit. Since the values of resistors 28*a* and 16*a* and capacitor 9*a* have been chosen so as to allow the return of the second trigger circuit to its initial state only after a full cycle, the potential of junction 12*a* remains depressed and diode 4*a* remains cut off, so that the negative-going pulse corresponding to point 1 of the operating cycle cannot reach junction 12*a*.

The same conditions are repeated at points 13 and 9, as shown by curves C1 and C2 of Fig. 2. During the next three points, however, the second trigger circuit returns to its initial state under the effect of the voltage increase applied to right-hand grid 10*a* of tube T3. The resulting voltage increase of anode 8*a* transmits a positive-going pulse to the anode of diode 4*a*. Since the voltage of junction 12 is still depressed, diode 4 furnishes no negative-going pulse to capacitor 18, so that the second trigger circuit remains untriggered. As soon as the first trigger circuit comes back to its initial state, the voltage of junction 12 again increases and a negative-going pulse corresponding to point 5 of the operating cycle is transmitted simultaneously to right-hand grids 10 and 10*a*, respectively of tubes T2 and T3. To obtain stable operation of the storage device under these conditions, therefore, it is sufficient for the period of the second trigger circuit to be such that it returns to its initial condition at any time between the third and fourth pulses of curve C1 (Fig. 2).

As has been previously stated, a tube T4 is provided for the purpose of providing, at a selected operating cycle, an output pulse corresponding in time position to the stored digit. For this purpose it is sufficient to prepare tube T4 by the application of a suitable positive voltage to terminal 26 connected to grid 24 of this tube. When the second trigger circuit is triggered at point 5, a positive-going pulse is transmitted through capacitor 33 to grid 23, thus rendering tube T4 conductive. An output pulse is developed at terminal 27, connected to the cathode of tube T4.

If it is desired to store a second value, tube T1 is cut off, as already explained, until the first and second trigger circuits return to their initial states, and then tube T1 is rendered conductive as soon as an input pulse corresponding in time position to the new value to be stored or recorded arrives at cathode 1. This mode of storing, or recording, is advantageous in that no special control is necessary for resetting the system to zero. On the other hand, an additional cycle is required to permit the storing, or recording, of a new input value. With such an arrangement, when the second value to be stored is equal to 8, for example, pulse trains are obtained as illustrated by curves B1, C5 and C6 of Fig. 4, which illustrate the storing of the value 5 in a first cycle and a value 8 in the second succeeding cycle.

In accordance with an important feature of the present invention, a second value may be stored without the loss of a cycle. This is accomplished by connecting grids 17 and **17*a* respectively to terminals 20 and 20*a* through capacitors 21 and 21*a*. At the beginning of each new storage cycle, the left-hand portions of tubes T2 and T3 are cut off by the application to terminals 20 and 20*a*** of a negative-going pulse such as that shown by curve F of Fig. 5. The two monostable trigger circuits are thus immediately restored to their rest conditions. For the storage of the value 8 in this case, it is sufficient to cut off tube T1 only until point 8 of the next succeeding operating cycle is reached. Thus pulse trains are obtained such as those represented by curves B1, C7 and C8 of Fig. 5, the value 5 being stored in a first cycle and the value 8 in the next succeeding cycle.

Figure 3:
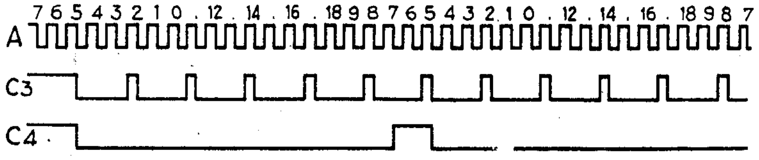
Figure 4:
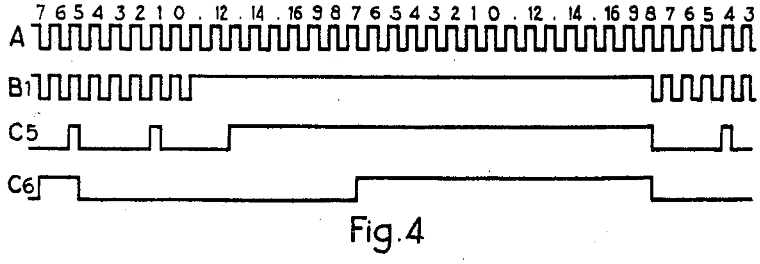
Figure 5:
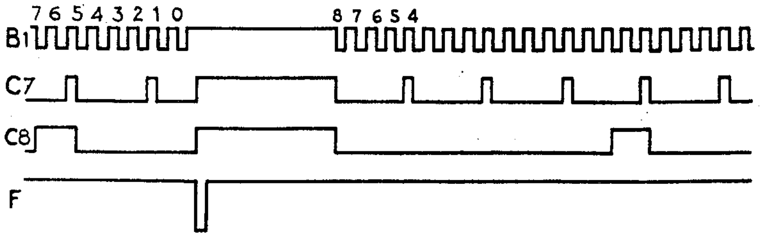

It will be apparent that any other division of the operating cycle could be employed without departing from the scope of the invention. For example, if the operating cycle comprises eighteen points, the period of the first trigger circuit could correspond to the duration of six pulses or, if desired, to the duration of only three pulses as illustrated by the curves of Fig. 3.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A storage device for electrical pulses comprising: a source of uniformly spaced signal pulses; a plurality of monostable trigger circuits having cycling times corresponding respectively to predetermined numbers of said signal pulses, said numbers comprising increasing integral multiples; means for utilizing a selected one of said signal pulses to initially trigger said trigger circuits; and means for preventing further application of said signal pulses to each of said trigger circuits for its cycling time, and for preventing the triggering of each successive one of said trigger circuits except simultaneously with the triggering of the preceding one of said trigger circuits.

2. A storage device for electrical pulses comprising: a source of uniformly spaced signal pulses; a first monostable trigger circuit having a cycling time corresponding to a first predetermined number of said signal pulses; a second monostable trigger circuit having a cycling time corresponding to a second predetermined number of said signal pulses, said second number being an integral multiple of said first number; means for utilizing a selected one of said signal pulses to initially trigger said first and second trigger circuits; and means for preventing further application of said signal pulses to said first trigger circuit for its cycling time and to said second trigger circuit for its cycling time, and for preventing the triggering of said second trigger circuit except simultaneously with the triggering of said first trigger circuit.

3. A storage device for electrical pulses comprising: a source of uniformly spaced signal pulses; a first monostable trigger circuit having a cycling time corresponding to a first predetermined number of said signal pulses; a second monostable trigger circuit having a cycling time corresponding to a second predetermined number of said signal pulses, said second number being the integral N times said first number; means for utilizing a selected one of said signal pulses to initially trigger said first and second trigger circuits; and means for preventing further application of said signal pulses to said first trigger circuit for its cycling time and to said second trigger circuit until said first trigger circuit has completed N cycles, and for preventing the triggering of said second trigger circuit except simultaneously with the triggering of said first trigger circuit.

4. A storage device for electrical pulses comprising: a source of uniformly spaced signal pulses; a first monostable trigger circuit having a cycling time corresponding to a first predetermined number of said signal pulses; a second monostable trigger circuit having a cycling time corresponding to a second predetermined number of said signal pulses, said second number being an integral multiple of said first number; triggering terminals for said first and second trigger circuits; means for applying a selected one of said signal pulses to said triggering terminals to initially trigger said first and second trigger circuits; means for stabilizing said trigger circuits comprising means for restricting the potential excursions of said triggering terminals; and means for preventing further application of said signal pulses to said first trigger circuit for its cycling time and to said second trigger circuit for its cycling time, and for preventing the triggering of said second trigger circuit except simultaneously with the triggering of said first trigger circuit.

5. A storage device for electrical pulses comprising: a source of uniformly spaced signal pulses; a first monostable trigger circuit having a cycling time corresponding to a first predetermined number of said signal pulses; a second monostable trigger circuit having a cycling time corresponding to a second predetermined number of said signal pulses, said second number being an integral multiple of said first number; triggering terminals for said first and second trigger circuits; a source of potential supply for said trigger circuits; means for applying a selected one of said signal pulses to said triggering terminals to initially trigger said first and second trigger circuits; means for stabilizing said trigger circuits comprising means associated with said potential-supply source for restricting the potential excursions of said triggering terminals; and means for preventing further application of said signal pulses to said first trigger circuit for its cycling time and to said second trigger circuit for its cycling time, and for preventing the triggering of said second trigger circuit except simultaneously with the triggering of said first trigger circuit.

6. A storage device for electrical pulses comprising: a source of uniformly spaced signal pulses; a first monostable trigger circuit having a cycling time corresponding to a first predetermined number of said signal pulses;

a second monostable trigger circuit having a cycling time corresponding to a second predetermined number of said signal pulses, said second number being an integral multiple of said first number; means for utilizing a selected one of said signal pulses to initially trigger said first and second trigger circuits; resetting means associated with said trigger circuits; and means for preventing further application of said signal pulses to said first trigger circuit for its cycling time and to said second trigger circuit for its cycling time, and for preventing the triggering of said second trigger circuit except simultaneously with the triggering of said first trigger circuit.

References Cited in the file of this patent

UNITED STATES PATENTS

| | | |
|---|---|---|
| 2,390,608 | Miller et al. | Dec. 11, 1945 |
| 2,480,582 | Houghton | Aug. 30, 1949 |
| 2,515,271 | Smith et al. | July 18, 1950 |
| 2,608,651 | Emmett | Aug. 26, 1952 |
| 2,613,318 | Snyder et al. | Oct. 7, 1952 |
| 2,644,887 | Wolfe | July 7, 1953 |
| 2,661,421 | Talamini et al. | Dec. 1, 1953 |
| 2,710,913 | Sherertz | June 14, 1955 |